United States Patent
Yamaura

(10) Patent No.: US 10,468,708 B2
(45) Date of Patent: Nov. 5, 2019

(54) END PLATE OF FUEL CELL STACK AND SEAL STRUCTURE OF FUEL CELL STACK

(71) Applicant: TOYOTA BOSHOKU KABUSHIKI KAISHA, Aichi-ken (JP)

(72) Inventor: Kunihiro Yamaura, Tokai (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 100 days.

(21) Appl. No.: 15/921,317

(22) Filed: Mar. 14, 2018

(65) Prior Publication Data
US 2018/0287183 A1    Oct. 4, 2018

(30) Foreign Application Priority Data
Mar. 31, 2017    (JP) .................... 2017-072073

(51) Int. Cl.
*H01M 8/2485* (2016.01)
*H01M 8/0273* (2016.01)
*H01M 8/2475* (2016.01)

(52) U.S. Cl.
CPC ....... *H01M 8/2485* (2013.01); *H01M 8/0273* (2013.01); *H01M 8/2475* (2013.01); *H01M 2250/20* (2013.01)

(58) Field of Classification Search
CPC .................... H01M 8/2475; H01M 8/2483
See application file for complete search history.

(56) References Cited

U.S. PATENT DOCUMENTS

| | | | | |
|---|---|---|---|---|
| 6,372,373 B1* | 4/2002 | Gyoten | ............... | H01M 8/0254 429/461 |
| 6,531,236 B1* | 3/2003 | Hatoh | ................ | H01M 8/2483 429/454 |
| 2010/0227246 A1* | 9/2010 | Iizuka | ................ | H01M 8/0228 429/479 |
| 2011/0300460 A1* | 12/2011 | Barnard | ............ | H01M 8/04014 429/427 |
| 2012/0009506 A1* | 1/2012 | Tanahashi | ........... | H01M 8/0273 429/535 |
| 2014/0377679 A1* | 12/2014 | Yamamoto | ............ | H01M 8/006 429/454 |

(Continued)

FOREIGN PATENT DOCUMENTS

| | | |
|---|---|---|
| CA | 2911500 | 5/2016 |
| JP | 2016-96032 | 5/2016 |

*Primary Examiner* — Matthew J Merkling
(74) *Attorney, Agent, or Firm* — Greenblum & Bernstein, P.L.C.

(57) ABSTRACT

An end plate of a fuel cell stack includes a metal plate body and a resin cover. The plate body includes a main portion, through holes extending through the main portion, and a flange portion including a fastening surface fastened to a flange of a case. The main portion includes a peripheral surface including a peripheral recess and an inner end surface that projects toward the inner side from the fastening surface. The cover includes an inner portion, a peripheral portion that covers the peripheral surface of the main portion, and an opposing portion that covers an inner end surface of the flange portion and opposes the flange of the case. The peripheral portion includes a peripheral projection that fills the peripheral recess and restricts contraction of the peripheral portion toward the inner side.

4 Claims, 3 Drawing Sheets

(56) References Cited

U.S. PATENT DOCUMENTS

| | | | |
|---|---|---|---|
| 2016/0126563 A1* | 5/2016 | Hotta | H01M 8/0202 |
| | | | 429/468 |
| 2016/0141662 A1* | 5/2016 | Takeyama | H01M 8/04201 |
| | | | 429/444 |
| 2016/0344043 A1* | 11/2016 | Ichioka | H01M 8/2465 |
| 2018/0034091 A1* | 2/2018 | Shimizu | H01M 8/2483 |
| 2018/0047995 A1* | 2/2018 | Shimizu | H01M 8/02 |
| 2018/0287183 A1* | 10/2018 | Yamaura | H01M 8/0273 |
| 2018/0309151 A1* | 10/2018 | Yamaura | H01M 8/2484 |

* cited by examiner

END PLATE OF FUEL CELL STACK AND SEAL STRUCTURE OF FUEL CELL STACK

BACKGROUND OF THE INVENTION

The present disclosure relates to an end plate arranged on an end of a cell stack body of a fuel cell stack in a stacking direction and including a plurality of circulation holes through which a fluid flows to and from flow passages in the cell stack body and to a seal structure that seals a portion between a case that accommodates the cell stack body and the end plate.

A fuel cell includes a fuel cell stack. The fuel cell stack includes a cell stack body formed by stacking a plurality of plate-shaped battery cells in a thickness-wise direction, a case that accommodates the cell stack body, two end plates located at opposite sides of the cell stack body in a stacking direction, and a plurality of connection pipes connected to the end plates (for example, refer to Japanese Laid-Open Patent Publication No. 2016-96032).

Japanese Laid-Open Patent Publication No. 2016-96032 (D1) describes an end plate including a plurality of circulation holes through which anode gas, cathode gas, and a cooling medium (hereinafter referred to as the fluid) respectively flow to and from a plurality of flow passages formed in the cell stack body.

The end plate described in publication D1 includes a metal plate body and a resin cover. The plate body includes a main portion and a plurality of through holes that form the circulation holes and extend through the main portion. The cover includes an inner portion that covers wall surfaces of the through holes (refer to, for example, FIGS. 7, 9, and 10 of publication D1). The plate body includes a flange portion including a fastening surface fastened to a flange of a case. An end surface of the main portion that is closer to a cell stack body (inner side) projects toward the inner side from the fastening surface of the flange portion. The cover includes a peripheral portion that is formed integrally with the inner portion and covers a peripheral surface of the main portion of the plate body. The cover is formed integrally with the plate body through insert-molding performed by arranging the plate body in a mold and injecting molten resin into the mold.

Further, it is known in the prior art that the fastening surface of the flange portion can include an accommodation groove to accommodate a gasket used to seal the portion between the end plate and the case.

SUMMARY OF THE INVENTION

The formation of an accommodation groove in the fastening surface of the flange portion to accommodate a gasket may lead to the shortcomings that will now be described. When the end plate is used in a vehicle fuel cell, in coastal areas, for example, salt water may enter the accommodation groove through gaps formed between the end plate and the case. This may corrode the plate body from the accommodation groove.

It is an object of the present invention to provide an end plate of a fuel cell stack and a seal structure of the fuel cell stack that limits adverse effects in the sealing between the end plate and a case.

According to one aspect of the present invention, an end plate of a fuel cell stack is arranged on an end of a cell stack body of the fuel cell stack in a stacking direction and includes a plurality of circulation holes through which a fluid flows to and from flow passages in the cell stack body. The end plate includes a metal plate body and a resin cover. The plate body includes a main portion, a plurality of through holes extending through the main portion and forming the circulation holes, and a flange portion including a fastening surface fastened to a flange of a case that accommodates the cell stack body. The cover includes an inner portion that covers a wall surface defining each of the through holes. When referring to a side of the plate body in a thickness-wise direction that is closer to the cell stack body as an inner side and a side of the plate body that is farther from the cell stack body as an outer side, the main portion includes a peripheral surface including a peripheral recess and an inner end surface that projects toward the inner side from the fastening surface of the flange portion. The cover further includes a peripheral portion that covers the peripheral surface of the main portion and an opposing portion that is integrated with the peripheral portion. The opposing portion covers an inner end surface of the flange portion and opposes the flange of the case. The peripheral portion includes a peripheral projection that fills the peripheral recess and restricts contraction of the peripheral portion toward the inner side.

According to another aspect of the present invention, a seal structure of a fuel cell stack includes the end plate, a case that accommodates the cell stack body and includes a flange fastened to the fastening surface of the flange portion of the plate body, an accommodation groove formed in either one of the opposing portion of the cover and a portion in the flange of the case opposing the opposing portion, and a gasket accommodated in the accommodation groove. The gasket seals a portion between the end plate and the case.

Other aspects and advantages of the present invention will become apparent from the following description, taken in conjunction with the accompanying drawings, illustrating by way of example the principles of the invention.

DETAILED DESCRIPTION OF THE PREFERRED EMBODIMENTS

One embodiment of the present invention will now be described with reference to FIGS. 1 to 4.

Figure 1:
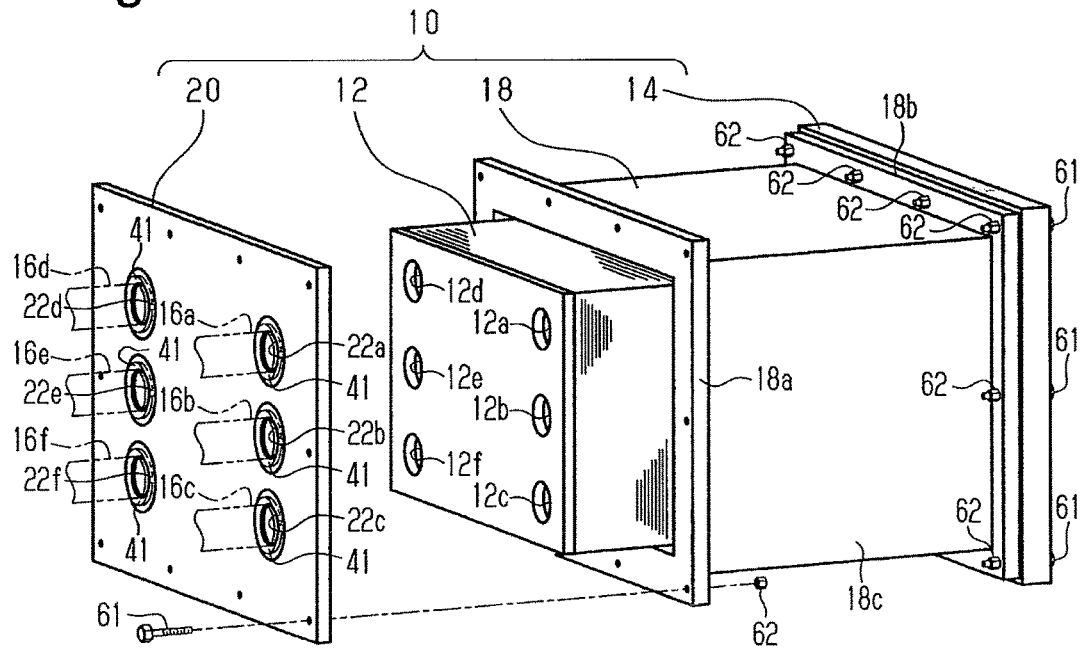
FIG. 1 is an exploded perspective view showing one embodiment of an end plate of a fuel cell stack and a seal structure of the fuel cell stack in which the end plate, a cell stack body, a case, and another end plate are spaced apart from one another.
Figure 2:
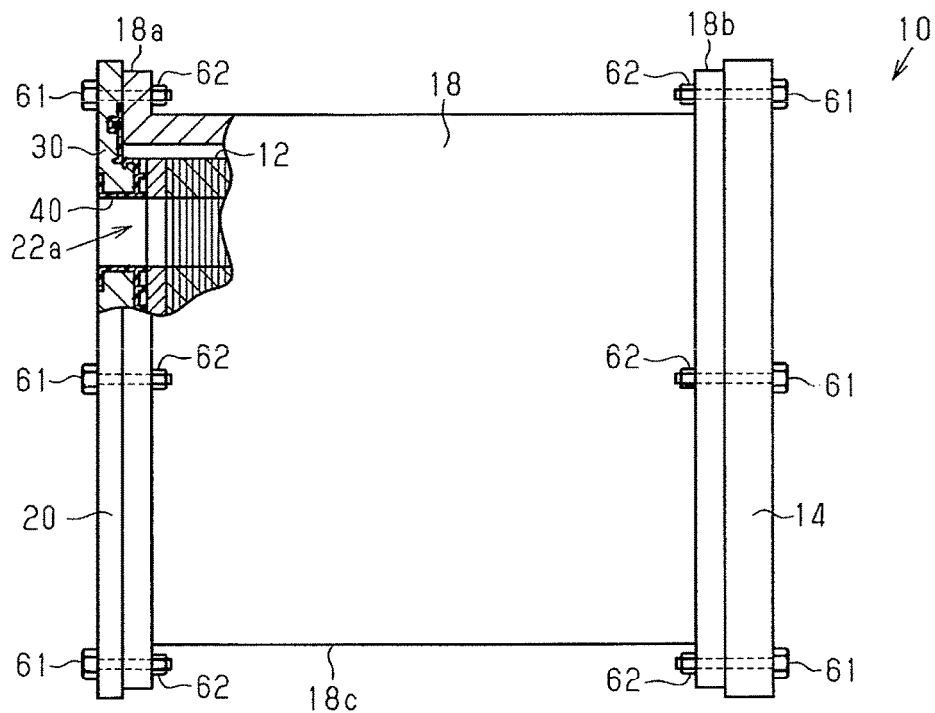
FIG. 2 is a side view showing the fuel cell stack of the embodiment of FIG. 1.

As shown in FIGS. 1 and 2, a fuel cell stack 10 includes a cell stack body 12 formed by stacking a plurality of plate-shaped battery cells in a thickness-wise direction, a case 18 that accommodates the cell stack body 12, and two end plates 14 and 20 located at opposite sides of the cell stack body 12 in a stacking direction. In the following description, the stacking direction of the cell stack body 12 is hereinafter simply referred to as the stacking direction.

Cell Stack Body 12

As shown in FIG. 1, the cell stack body 12 includes three flow passages 12a to 12c used to supply the battery cells with anode gas (for example, hydrogen gas), cathode gas (for example, oxygen gas in air), and a cooling medium (for example, cooling water), respectively. The cell stack body 12 further includes three flow passages 12d to 12f used to discharge the anode gas, the cathode gas, and the cooling medium that have been used by the battery cells to generate power. To facilitate understanding, FIG. 1 shows part of the cell stack body 12 projected out of the case 18.

Case 18

As shown in FIGS. 1 and 2, the case 18 includes a peripheral wall 18c that surrounds the periphery of the cell stack body 12. The case 18 includes two open ends in the stacking direction where flanges 18a and 18b are arranged.

End Plates 14, 20

As shown in FIG. 1, the first end plate 20 includes a plurality of circulation holes 22a to 22f through which the anode gas, the cathode gas, and the cooling medium (hereinafter referred to as the fluid) flow to and from the flow passages 12a to 12f of the cell stack body 12.

As shown by the double-dashed lines in FIG. 1, a plurality of connection pipes 16a to 16f through which the anode gas, the cathode gas, and the cooling medium are supplied or discharged are connected to the circulation holes 22a to 22f of the end plate 20, respectively.

The second end plate 14 does not include circulation holes.

The structure of the end plate 20 will now be described.

Figure 3:
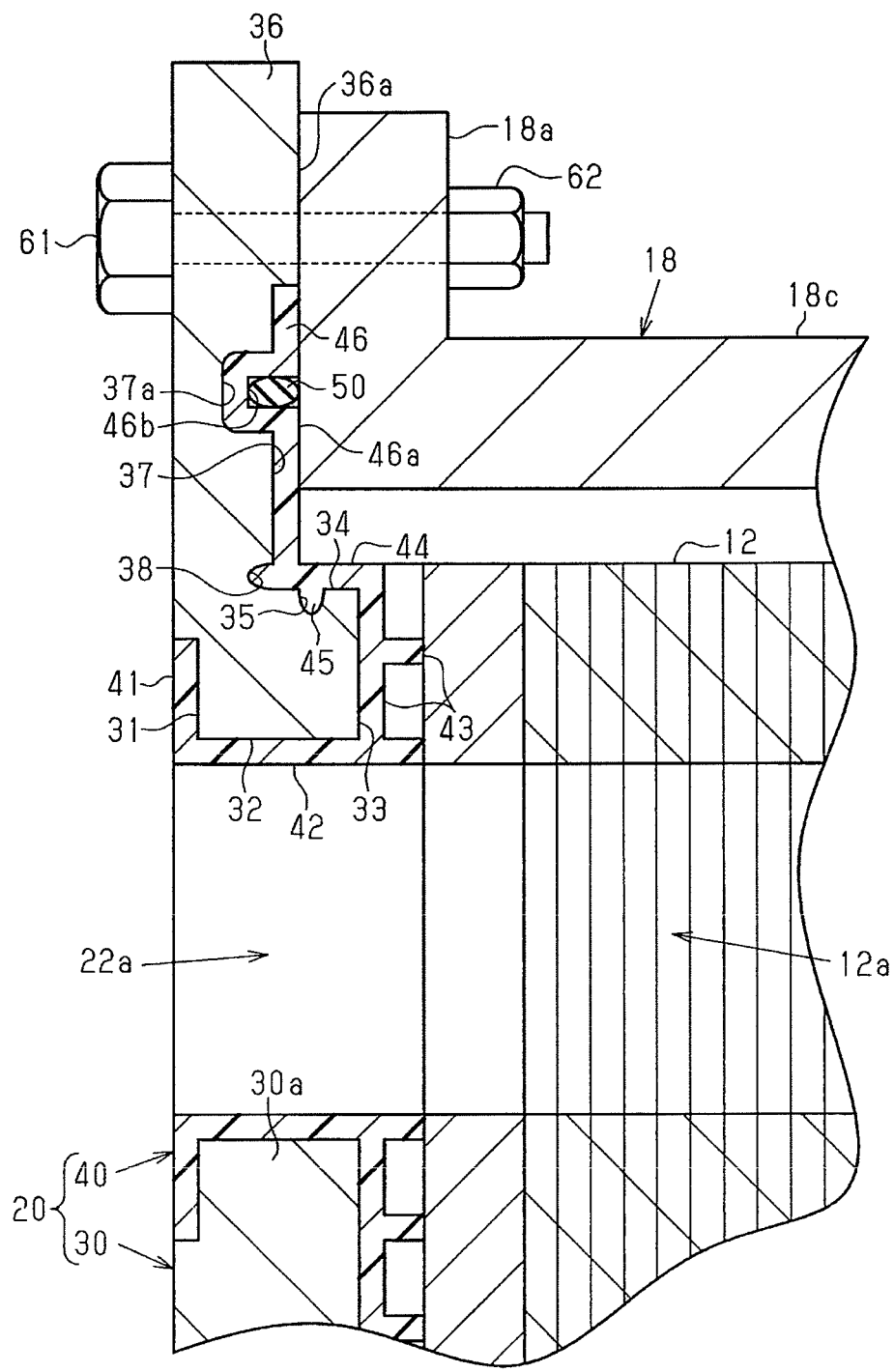
FIG. 3 is a partially enlarged cross-sectional view of FIG. 2.

As shown in FIG. 3, the end plate 20 includes an aluminum plate body 30 and a resin cover 40. The plate body 30 includes a main portion 30a and a plurality of through holes 32 that extend through the main portion 30a. The cover 40 includes an inner portion 42 that covers the wall surfaces defining the through holes 32. The through holes 32 form the circulation holes 22a to 22f. The cover 40 is formed from an electrically insulative synthetic resin such as polypropylene.

The plate body 30 is formed through die casting, which is a metal casting process. The cover 40 is formed integrally with the plate body 30 through insert-molding performed by arranging the plate body 30 in a mold (not shown) and injecting molten resin into the mold.

In the following description, the "inner side" refers to the side of the plate body 30 in the thickness-wise direction that is closer to the cell stack body 12 (right side in FIG. 3), and the "outer side" refers to the side that is farther from the cell stack body 12 (left side in FIG. 3).

Figure 4:
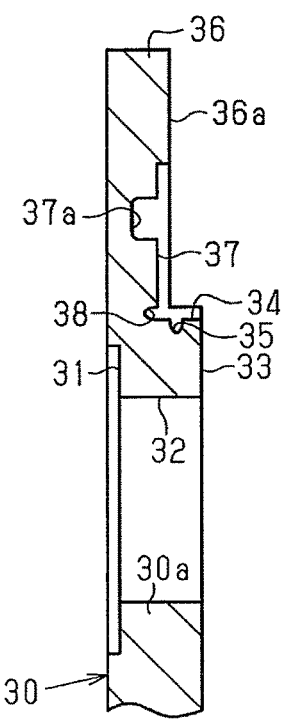
FIG. 4 is a partially cross-sectional view showing a plate body that forms the end plate of the embodiment of FIG. 1.

As shown in FIGS. 3 and 4, a flange portion 36 is formed on the periphery of the main portion 30a of the plate body 30.

As shown in FIG. 3, the flange portion 36 is fastened to the flange 18a by bolts 61 and nuts 62 with a fastening surface 36a, which is an end surface of the inner side of the flange portion 36, abutting against the flange 18a of the case 18.

As shown in FIGS. 3 and 4, the main portion 30a includes an inner end surface 33 that projects toward the inner side from the fastening surface 36a of the flange portion 36.

Outer recesses 31 that are continuous with the through holes 32 and have a larger diameter than the through holes 32 are formed in the outer end surface of the main portion 30a of the plate body 30.

A plurality of peripheral recesses 35 are formed at intervals in a peripheral surface 34 of the main portion 30a in a circumferential direction of the main portion 30a. The peripheral recesses 35 are located on the same plane as the fastening surface 36a in the thickness-wise direction of the plate body 30.

In the present embodiment, the plate body 30 is formed through die casting, and the flange portion 36 is machined with a milling machine (not shown) to form an inner end surface of the flange portion 36. The peripheral recesses 35 are formed by a portion in a side surface (base) of the milling cutter. In a casting process of die casting, the mold-removal direction coincides with the thickness-wise direction of the plate body 30. Thus, the peripheral recesses 35 need to be formed in another process subsequent to the casting process.

An inner portion in the inner end surface of the flange portion 36 includes an opposing recess 37 directed toward the flange 18a of the case 18. The opposing recess 37 extends to the peripheral surface 34 of the main portion 30a and around the entire peripheral surface 34. The opposing recess 37 includes a portion opposing the flange 18a of the case 18 where the depth increases to form a looped groove 37a.

A trench 38 in a corner between the peripheral surface of the main portion 30a and the opposing recess 37 has a greater depth than the remaining portions of the opposing recess 37 excluding the looped groove 37a.

As shown in FIG. 3, each outer recess 31 of the main portion 30a is filled with an outer portion 41 of the cover 40. The outer portion 41 extends outward in the radial direction from an outer end of the inner portion 42 of the cover 40. The outer portion 41 forms a connection surface to which the corresponding connection pipe 16a (refer to FIG. 1) is connected.

An inner portion 43 abutting against the cell stack body 12 extends outward in the radial direction on the inner end surface 33 of the main portion 30a from an inner end of the inner portion 42 of the cover 40.

The cover 40 includes a peripheral portion 44 and an opposing portion 46. The peripheral portion 44 extends outward from the periphery of the inner portion 43 and covers the peripheral surface 34 of the main portion 30a. The opposing portion 46 fills the opposing recess 37 of the flange portion 36 and covers the inner end surface of the flange portion 36.

The peripheral portion 44 includes a peripheral projection 45 that fills the peripheral recess 35 and restricts contraction of the peripheral portion 44 toward the inner side. Further, the trench 38 is filled with the cover 40.

The opposing portion 46 includes an inner end surface 46a that is flush with the fastening surface 36a of the flange portion 36.

The inner end surface 46a of the opposing portion 46 includes a looped accommodation groove 46b at a location opposing the flange 18a of the case 18. The accommodation groove 46b is located at a position corresponding to the looped groove 37a of the opposing recess 37. The accommodation groove 46b accommodates a looped gasket 50 that seals a portion between the end plate 20 and the case 18.

The operation of the present embodiment will now be described.

When arranging the plate body 30 in the mold and performing insert-molding on the cover 40, the peripheral portion 44 and the opposing portion 46 are integrally molded. Even when the peripheral portion 44 cools and contracts after molding the cover 40, the peripheral projection 45 of the peripheral portion 44 of the cover 40 filling the peripheral recess 35 formed in the peripheral surface 34 of the main portion 30a of the plate body 30 restricts contraction of the peripheral portion 44 toward the inner side. This limits situations in which the opposing portion 46 of the cover 40 is lifted from the flange portion 36.

The present embodiment has the advantages described below.

(1) The plate body 30 of the end plate 20 includes the flange portion 36, which includes the fastening surface 36a fastened to the flange 18a of the case 18 that accommodates the cell stack body 12. The inner end surface 33 of the main portion 30a projects toward the inner side from the fastening surface 36a of the flange portion 36. The cover 40 integrally includes the peripheral portion 44, which covers the peripheral surface 34 of the main portion 30a of the plate body 30, and the opposing portion 46, which covers the inner end surface of the flange portion 36 and opposes the flange 18a of the case 18. The peripheral surface 34 of the main portion 30a includes the peripheral recess 35, and the peripheral portion 44 includes the peripheral projection 45 that fills the peripheral recess 35 and restricts contraction of the peripheral portion 44 toward the inner side.

Such a structure limits situations in which the opposing portion 46 of the cover 40 is lifted from the flange portion 36 of the plate body 30. This allows the fastening surface 36a of the flange portion 36 to be fastened in close contact with the flange 18a of the case 18. Thus, even when operation of the fuel cell stack 10 repetitively raises the temperature and causes creep deformation and contraction of the opposing portion 46, loosening of the flange portion 36 of the plate body 30 from the flange 18a of the case 18 is limited.

Figure 5:
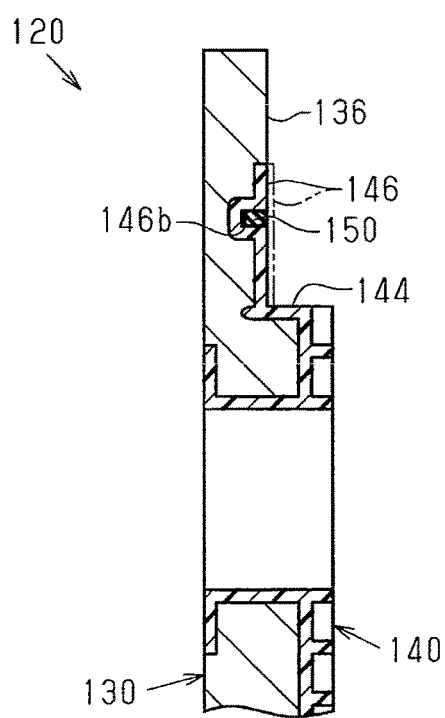
FIG. 5 is a partially cross-sectional view showing a comparative embodiment of an end plate.

In a comparative embodiment shown in FIG. 5, an accommodation groove 146b is formed in part of a resin cover 140 (opposing portion 146) in the same manner as the above embodiment. This avoids the corrosion of a plate body 130 from the accommodation groove. However, an end plate 120 of the comparative embodiment does not include the peripheral recess 35 and the peripheral projection 45. Thus, when the cover 140 contracts after undergoing molding, a peripheral portion 144 of the cover 140 contracts toward the inner side causing the opposing portion 146 to be lifted from the flange portion 136. Thus, a case is fastened to the end plate 120 with a flange of the case abutting against the lifted opposing portion 146. In this case, when the opposing portion 146 undergoes creep deformation and contracts through the repetition of temperature rise resulting from operation of a fuel cell stack, bolts that fasten the flange portion 136 of the plate body 130 to the flange of the case tend to loosen. This may lower the seal pressure of a gasket 150 and lower the water resistance.

(2) The flange portion 36 of the plate body 30 includes the opposing recess 37, which is filled with the opposing portion 46 of the cover 40, and the inner end surface 46a of the opposing portion 46 is flush with the fastening surface 36a of the flange portion 36.

With this structure, the opposing portion 46 of the cover 40 is flush with the fastening surface 36a of the flange portion 36 of the plate body 30. Thus, the surface of the end plate 20 fastened to the flange 18a of the case 18 is flat. This simplifies the shape of the flange 18a of the case 18.

(3) The peripheral recess 35 is located on the same plane as the fastening surface 36a in the thickness-wise direction of the plate body 30.

The more outward the peripheral recess is located in the thickness-wise direction of the plate body 30, the more effectively displacement of an outer location of the peripheral portion 44 can be restricted and the more effectively lifting of the opposing portion 46 of the cover 40 is limited.

With the above structure, the peripheral recess 35 is substantially located at the outermost side. This restricts displacement of the outer end of the peripheral portion 44 and effectively limits the lifting of the opposing portion 46 that is continuous with the outer end.

(4) The seal structure of the fuel cell stack 10 includes the end plate 20 and the case 18, which accommodates the cell stack body 12 and includes the flange 18a fastened to the fastening surface 36a of the flange portion 36 of the plate body 30. The accommodation groove 46b is formed in the inner end surface 46a of the opposing portion 46 of the cover 40. The accommodation groove 46b accommodates the gasket 50, which seals the portion between the end plate 20 and the case 18.

This structure limits loosening of the fastening surface 36a of the flange portion 36 of the plate body 30 from the flange 18a of the case 18. Thus, decreases in the seal pressure of the gasket 50 are limited, and adverse effects in the sealing between the end plate 20 and the case 18 are limited.

MODIFIED EXAMPLES

It should be apparent to those skilled in the art that the present invention may be embodied in many other specific forms without departing from the spirit or scope of the invention. Particularly, it should be understood that the present invention may be embodied in the following forms.

The peripheral recess 35 may be formed at the inner side of the fastening surface 36a of the plate body 30.

The accommodation groove 46b of the opposing portion 46 of the cover 40 may be omitted. Instead, an accommodation groove that accommodates the gasket 50 may be formed in a surface of the flange 18a of the case 18 that opposes the opposing portion 46.

The peripheral recess 35 may extend around the entire circumference of the peripheral surface 34 of the main portion 30a (plate body 30).

Therefore, the present examples and embodiments are to be considered as illustrative and not restrictive and the invention is not to be limited to the details given herein, but may be modified within the scope and equivalence of the appended claims.

The invention claimed is:

1. An end plate of a fuel cell stack arranged on an end of a cell stack body of the fuel cell stack in a stacking direction and including a plurality of circulation holes through which a fluid flows to and from flow passages in the cell stack body, the end plate comprising:
a metal plate body including
a main portion,
a plurality of through holes extending through the main portion and forming the circulation holes, and
a flange portion including a fastening surface fastened to a flange of a case that accommodates the cell stack body; and
a resin cover including an inner portion that covers a wall surface defining each of the through holes,
wherein when referring to a side of the plate body in a thickness-wise direction that is closer to the cell stack body as an inner side and a side of the plate body that is farther from the cell stack body as an outer side,
the main portion includes a peripheral surface including a peripheral recess and an inner end surface that projects toward the inner side from the fastening surface of the flange portion, the cover further includes a peripheral portion that covers the peripheral surface of the main portion and an opposing portion that is integrated with the peripheral portion, wherein the opposing portion covers an inner end surface of the flange portion and opposes the flange of the case, and the peripheral portion includes a peripheral projection that fills the peripheral recess and restricts contraction of the peripheral portion toward the inner side.

2. The end plate according to claim 1, wherein the flange portion of the plate body includes an opposing recess filled with the opposing portion of the cover, and an inner end surface of the opposing portion is flush with the fastening surface of the flange portion.

3. The end plate according to claim 2, wherein the peripheral recess is located on the same plane as the fastening surface in the thickness-wise direction of the plate body.

4. A seal structure of a fuel cell stack, the seal structure comprising:

the end plate according to claim 2;

a case that accommodates the cell stack body, wherein the case includes a flange fastened to the fastening surface of the flange portion of the plate body;

an accommodation groove formed in either one of the opposing portion of the cover and a portion in the flange of the case opposing the opposing portion; and a gasket accommodated in the accommodation groove, wherein the gasket seals a portion between the end plate and the case.

\* \* \* \* \*